Figure 1:
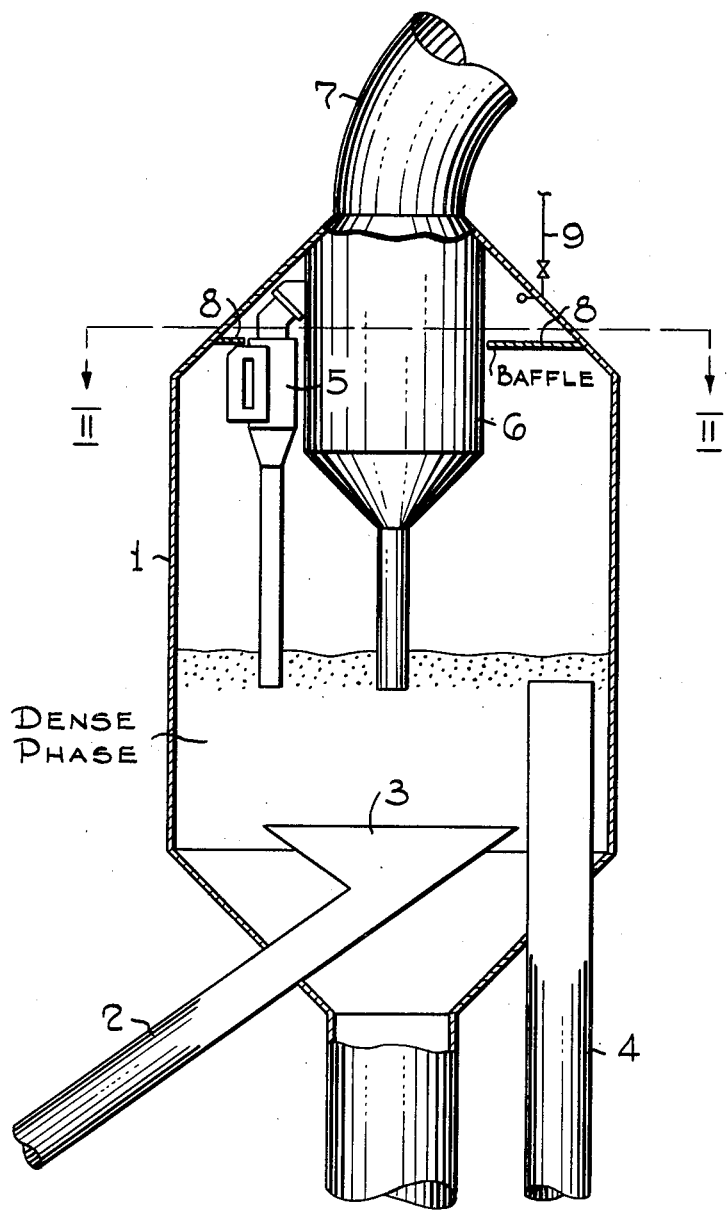

United States Patent Office 2,706,704
Patented Apr. 19, 1955

2,706,704

FLUIDIZED SOLIDS REACTOR AND PROCESS IN THE CONVERSION OF HYDROCARBONS

Walter Squires, Jr., Westfield, N. J., assignor to Esso Research and Engineering Company, a corporation of Delaware Application October 14, 1950, Serial No. 190,142

2 Claims. (Cl. 196—52)

The present invention is concerned with an improved fluidized solids reactor. The invention is more particularly concerned with a process and equipment for reducing upper cone coke formation in fluidized solids reactors, particularly in a petroleum oil fluidized solids catalytic cracking operation.

In accordance with the present invention a baffle is utilized, preferably in conjunction with steam purging to prevent access of hydrocarbon vapors to a stagnant area in the upper cone area of fluidized solids reactors.

The novelty of the invention resides in the steam purging in combination with a suitable baffle to remove hydrocarbons from a section of the fluid catalytic cracking reactor where otherwise they would react to produce undesirable coke deposits.

It is well known in the art to conduct various operations employing the fluidized solids technique. In general when utilized in conjunction with the cracking of a petroleum oil the system of a fluidized solids technique comprises a reaction zone and a regeneration zone, employed in conjunction with a fractionation zone. The reactor and the catalyst regenerator are arranged at approximately an even level. The operation of the reaction zone and the regeneration zone is conventional, which preferably is as follows:

An overflow pan is provided in the regeneration zone at the desired catalyst level. The catalyst overflows into a withdrawal line which preferably has the form of a U-shaped seal leg connecting the regeneration zone with the reaction zone. The feed stream introduced is usually preheated to a temperature in the range from about 500° F. to 650° F. in exchangers in heat exchange with regenerator flue gases which are removed overhead from the regeneration zone or with cracked products. The heated feed stream is withdrawn from the exchangers and introduced into the reactor. The seal leg is usually sufficiently below the point of feed oil injection to prevent oil vapors from backing into the regenerator in case of normal surges. Since there is no restriction in the overflow line from the regenerator, satisfactory catalyst flow will occur as long as the catalyst level in the reactor is slightly below the catalyst level in the regenerator when the vessels are carried at about the same pressure. Spent catalyst from the reactor flows through a second U-shaped seal leg from the bottom of the reactor into the bottom of the regenerator. The rate of catalyst flow is controlled by injecting some of the air into the catalyst transfer line to the regenerator.

The pressure in the regenerator may be controlled at the desired level by a throttle valve in the overhead line from the regenerator. Thus, the pressure in the regenerator may be controlled at any desired level by a throttle valve which may be operated, if desired, by a differential pressure controller. If the pressure differential between the two vessels is maintained at a minimum, the seal legs will prevent gases from passing from one vessel into the other in the event that the catalyst flow in the legs should cease.

The reactor and the regenerator may be designed for high velocity operation involving linear superficial gas velocities of from about 2.5 to 4 ft. per second. However, the superficial velocity of the upflowing gases may vary from about 1–5 and higher. Catalyst losses are minimized and substantially prevented in the reactor by the use of multiple stages of cyclone separators. The regeneration zone is provided with cyclone separators. These cyclone separators are usually from 2 to 3 and more stages.

Distributing grids may be employed in the reaction and regeneration zones. Operating temperatures and pressures may vary appreciably depending upon the feed stocks being processed and upon the products desired. Operating temperatures are, for example, in the range from about 800 to 1000° F., preferably about 850° F. to 950° F. in the reaction zone. Elevated pressures may be employed, but in general pressures below 100 lbs. per sq. in. gauge are utilized. Pressures generally in the range from 1 to 30 lbs. per sq. in. gauge are preferred. A catalyst hold-up corresponding to a space velocity of 1 to 20 weights per hour of feed per weight of catalyst is utilized. Catalyst to oil ratios of about 3 to 10, preferably about 6 to 8 by weight are used. The amount of catalyst used per volume of oil may be varied appreciably. However, the quantity used varies from about 5 to 20 lbs. of catalyst per lb. of oil.

The catalytic material used both in the suspensoid operation and in the fluidized catalyst cracking operation, in accordance with the present invention, are conventional cracking catalysts. These catalysts are oxides of metals of groups II, III, IV and V of the periodic table. A preferred catalyst comprises silica-alumina wherein the weight per cent of the alumina is in the range from about 5 to 20%. These catalysts may also contain a third constituent, as for example, $ThO_2$, $WO_3$, $MoO$, $BeO$, $Bi_2O_3$, $CdO$, $UO_3$, $B_2O_3$, $SnO_2$, $Fe_2O_3$, $V_2O_5$, $MnO$, $Cr_2O_3$, $CaO$, $Tl_2O_3$, $MgO$ and $Ce_2O_3$ present in the concentration from 0.05% to 0.5%.

The size of the catalyst particles is usually below about 200 microns. Usually at least 50% of the catalyst has a micron size in the range from about 20–80. Under these conditions with the superficial velocities as given, a fluidized bed is maintained where in the lower section of the reactor, a dense catalyst phase exists while in the upper area of the reactor a dispersed phase exists.

Thus, in this type of operation the interface between the dense phase and the dispersed phase of the fluidized solids is at an intermediate point in the reaction zone. The upflowing cracked gases are passed through multiple stages of cyclone separators or equivalent means disposed in the top of the reaction zone. For example, the upflowing cracked vapors containing finely-divided entrained solids phase through a series of cyclone separators operated in parallel, all of which communicate with a larger multiclone operating in series. In actual operation the cyclones are disposed somewhat below the multiclone. Under these conditions an upper coke formation occurs in the quiet spots of the reactor, particularly in the area of the multiclones and cyclones. In accordance with the present invention, this upper coke formation is substantially eliminated by the use of a baffle plate extending across the frustum of the cone at the upper part of the reactor. The present invention may be more fully understood by reference to the drawings illustrating embodiments of the same.

Figure 2:
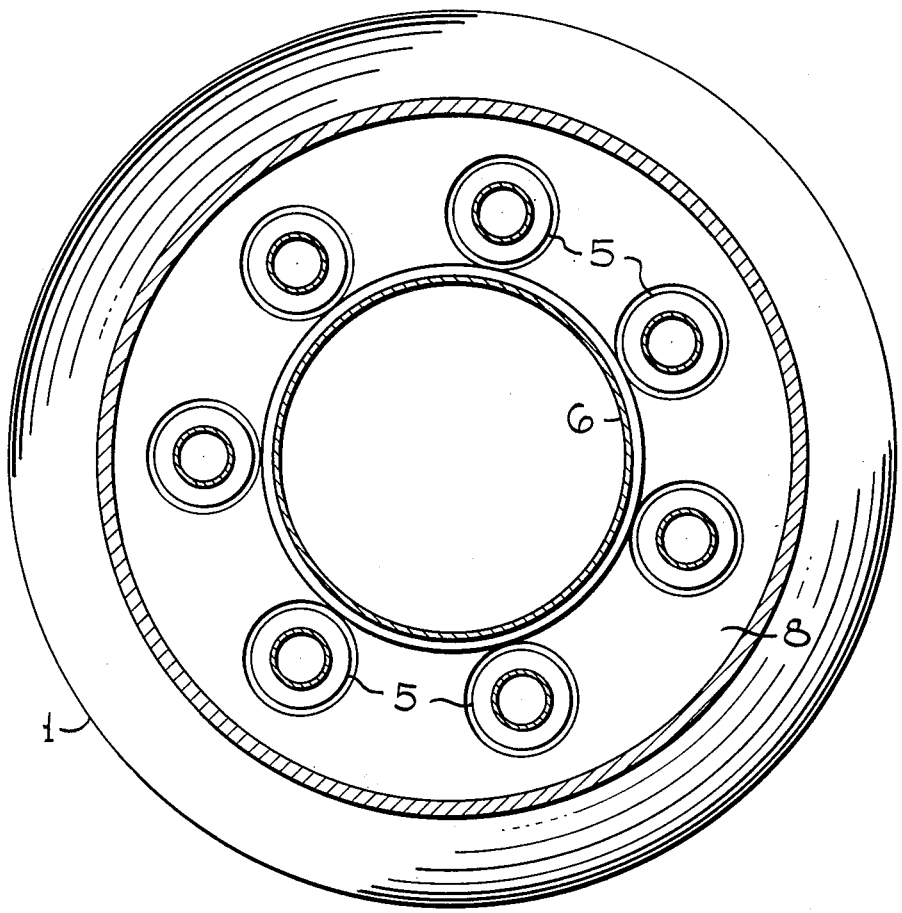

Figure 1 is a diagrammatical vertical view of a reaction zone, while Figure 2 is a cross-sectional top view taken through II—II. Referring specifically to Figure 1, a reaction zone 1 contains at the upper area thereof, a series of cyclone separators 5 and a multiclone separator 6. The dense phase is in the lower area of reactor 1 while the dispersed phase lies above the dense phase in the upper area of reaction zone 1. Feed gases and fresh catalyst are introduced into zone 1 by means of line 2 through a distributing head 3. Spent catalyst is withdrawn from zone 1 by means of conduit 4 and regenerated in a regeneration zone. Temperature and pressure conditions in zone 1 are adjusted to secure the desired conversion of the feed stock. Cracked gases are withdrawn from zone 1 through a series of cyclone separators 5 operating in parallel. Solid particles are segregated from the gases in the cyclones and returned to the fluid bed. The gases removed from the cyclones 5 are then introduced into a multiclone 6 wherein the final traces of solid particles are removed from the gases, which gases are removed overhead by means of conduit 7. In accordance with the present invention a plate or baffle element 8 is disposed above the cyclones. The baffle or plate element has suitable openings to permit the cyclones to extend upwardly through the plate. The plate is so designed so as to have an annular opening around the cyclones and the multiclone. Also in accordance with the present process, steam is introduced into the area above the plate in the reaction zone by suitable distributing means.

The present invention is broadly concerned with an improved fluidized catalyst operation, particularly one wherein hydrocarbon constituents are converted to lower boiling constituents. In accordance with the present invention coke formation in the top of the reaction zone is prevented by the use of inert gas, as for example, steam, nitrogen and the like in the top of said zone. The coke appears to form in stagnant areas such as the zone in the multiclone hopper above the mouths of the lower tubes and below the bottom tube sheet. The improvement is secured by utilizing a horizontal baffle or plate in the top of the reaction zone and by maintaining an inert gas above the baffle. The pressure maintained on the inert gas is sufficient to cause the gas to flow around annular openings in the baffle element into the lower reaction zone. The baffle is installed just above the inlets to the cyclone separators. The baffle may either be welded to the reactor or clamped to a ring which is welded to the cone. Holes are cut in the baffle to allow passage of the multiclones and cyclone separating elements. The holes should only be large enough to provide for expansion between the baffle on the one end and the multiclone and cyclones on the other. A preferred inert gas comprises low pressure steam for purging (about 350° F.) This steam is maintained under sufficient pressure to allow the same to pass out into the reactor through the expansion slots as indicated above. This steam flow outwardly will prevent hydrocarbons from getting into the area above the baffle and thus prevent coke formation in this area. The baffle reduces the amount of purged steam so that only a relatively small quantity is required. The steam can be brought to the correct temperature by flowing the same through a heat exchange element in the regenerator zone. The steam is preferably brought to reactor temperature (900–950° F.) in order to prevent heavy hydrocarbons in the reactor and catalyst separation equipment from condensing out on a surface cooled by low temperature steam.

The invention may be readily adapted for the prevention of coke in any thermal decomposition process, as for example, in any gas oil cracking operation in a fluidized solids process. It is particularly applicable, however, when employing relatively heavy feed stocks, as for example those having gravities below about 30° API, as for example in the range from about 20–30° API.

Having described the invention it is claimed:

1. An improved fluidized solids reactor comprising in combination, a vertically elongated vessel, means for introducing fluid constituents and solid particles into the lower portion of said vessel, a cyclone separator positioned within said vessel, the upper portion of the cyclone being sealed to the upper portion of the vessel, thereby normally forming a stagnant area in the upper portion of the vessel about the upper portion of the cyclone, an imperforate baffle sealed to and extending from the walls of said vessel at an upper portion thereof extending toward said cyclone and terminating in spaced relation thereto providing a restricted fluid passage between the stagnant area and the lower portion of the vessel, said passage being of sufficient size only to provide for expansion between said baffle and said cyclone, and gas inlet means for introduction of an inert gas above the said baffle whereby a sealing flow of inert gas through the restricted fluid passage can be maintained preventing access of said fluid constituents and solid particles to said stagnant area.

2. In the process of operating a reactor for conducting hydrocarbon conversion reactions utilizing a fluidized solids catalyst wherein said reactor comprises a reaction zone, a stagnant zone located above said reaction zone, a cyclone separator at least partially in said stagnant zone and extending into said reaction zone, and an imperforate baffle forming, in conjunction with said separator, a restricted fluid passage between said stagnant zone and said reaction zone, the improvement comprising introducing fluid constituents and solid particles into the lower portion of said reaction zone, maintaining an upward flow of fluid constituents in said reaction zone to maintain said solid particles in a fluidized condition, and simultaneously introducing a gas inert to said hydrocarbon conversion reaction into said stagnant zone under sufficient pressure to seal said stagnant zone from passage of said final constituents and said solid particles upwardly through said fluid passage means while maintaining fluidized conditions within said reaction zone.

References Cited in the file of this patent

UNITED STATES PATENTS

| Number | Name | Date |
|---|---|---|
| 1,470,359 | Greenstreet | Oct. 9, 1923 |
| 2,367,281 | Johnson | Jan. 16, 1945 |
| 2,427,341 | Alther | Sept. 16, 1947 |
| 2,433,726 | Angell | Dec. 30, 1947 |
| 2,471,398 | Simpson et al. | May 24, 1949 |
| 2,492,998 | Lassiat | Jan. 3, 1950 |
| 2,515,155 | Munday | July 11, 1950 |
| 2,535,140 | Kassel | Dec. 26, 1950 |